Oct. 8, 1963  H. C. WALKER ETAL  3,106,093
HARDNESS TESTING DEVICE FOR COMPONENTS HAVING
HARD TO MEASURE SURFACES
Filed Oct. 9, 1961  4 Sheets-Sheet 1

INVENTORS,
HENRY C. WALKER
ABRAM HILL
BY
ATTORNEYS.

Oct. 8, 1963    H. C. WALKER ETAL    3,106,093
HARDNESS TESTING DEVICE FOR COMPONENTS HAVING
HARD TO MEASURE SURFACES
Filed Oct. 9, 1961    4 Sheets-Sheet 2

INVENTORS
HENRY C. WALKER
ABRAM HILL
BY

ATTORNEYS

INVENTORS,
HENRY C. WALKER
ABRAM HILL

ATTORNEYS

United States Patent Office 3,106,093
Patented Oct. 8, 1963

3,106,093
HARDNESS TESTING DEVICE FOR COMPONENTS HAVING HARD TO MEASURE SURFACES
Henry C. Walker, 4607 McKinley St., and Abram Hill, 5604 Ormes St., both of Philadelphia, Pa.
Filed Oct. 9, 1961, Ser. No. 143,987
6 Claims. (Cl. 73—81)
(Granted under Title 35, U.S. Code (1952), sec. 266)

The invention described herein may be manufactured and used by or for the Government for governmental purposes without the payment to us of any royalty thereon.

This invention relates to a unique device which is capable of ready attachment to various hardness testing machines and more particularly concerns such a device which accurately, rapidly, and non-destructively determines the hardness of components having radial, ogival, or tapered surfaces.

United States Ordnance requirements for controlling quality of military components, such as armor piercing shot, for example, necessitate periodic hardness checks on random samples selected from production lots. Due to a soft "skin" formed on their surfaces during fabrication, it has been necessary in the past to penetrate the soft skin, on the bourrelet, for example, until a suitable surface was exposed which would permit reliable hardness measurements to be obtained. The amount of metal removed oftentimes reduced the diameter of the shot at the tested area to an extent where required tolerances could no longer be met and resulting in scrapping the shot to the economic disadvantage to the United States.

Additionally, and apart from Ordnance requirements, the determination of hardnesses on radial, ogival or tapered surfaces has presented an annoying problem insofar as rapidity and accuracy of measurements could be made. Heretofore, these surface areas on components to be tested were adjusted normal to the penetrator and testing machine and then rapidly supported until a reading was obtained. On succeeding determinations, it was necessary to readjust the component and again support it before an accurate reading could be taken. This practice requires cumbersome auxiliary equipment and such equipment does not admit of rapid hardness testing to satisfactorily meet production demands.

It is therefore a broad object of the present invention to overcome the foregoing difficulties and disadvantages.

Another object of the invention is to provide a device readily attachable to various hardness testing machines whereby measurements on radial, ogival or tapered surfaces may be made rapidly.

Still another object of the invention is to provide such a device which is readily adjustable to various size components having the aforementioned shapes.

Other and further objects of the invention will become obvious upon an understanding of the illustrative embodiments about to be described, or will be indicated in the appended claims, and various advantages not referred to herein will occur to one skilled in the art upon employment of the invention in practice.

In the accompanying drawings wherein like reference numerals and letters designate like parts throughout:

Figure 1:
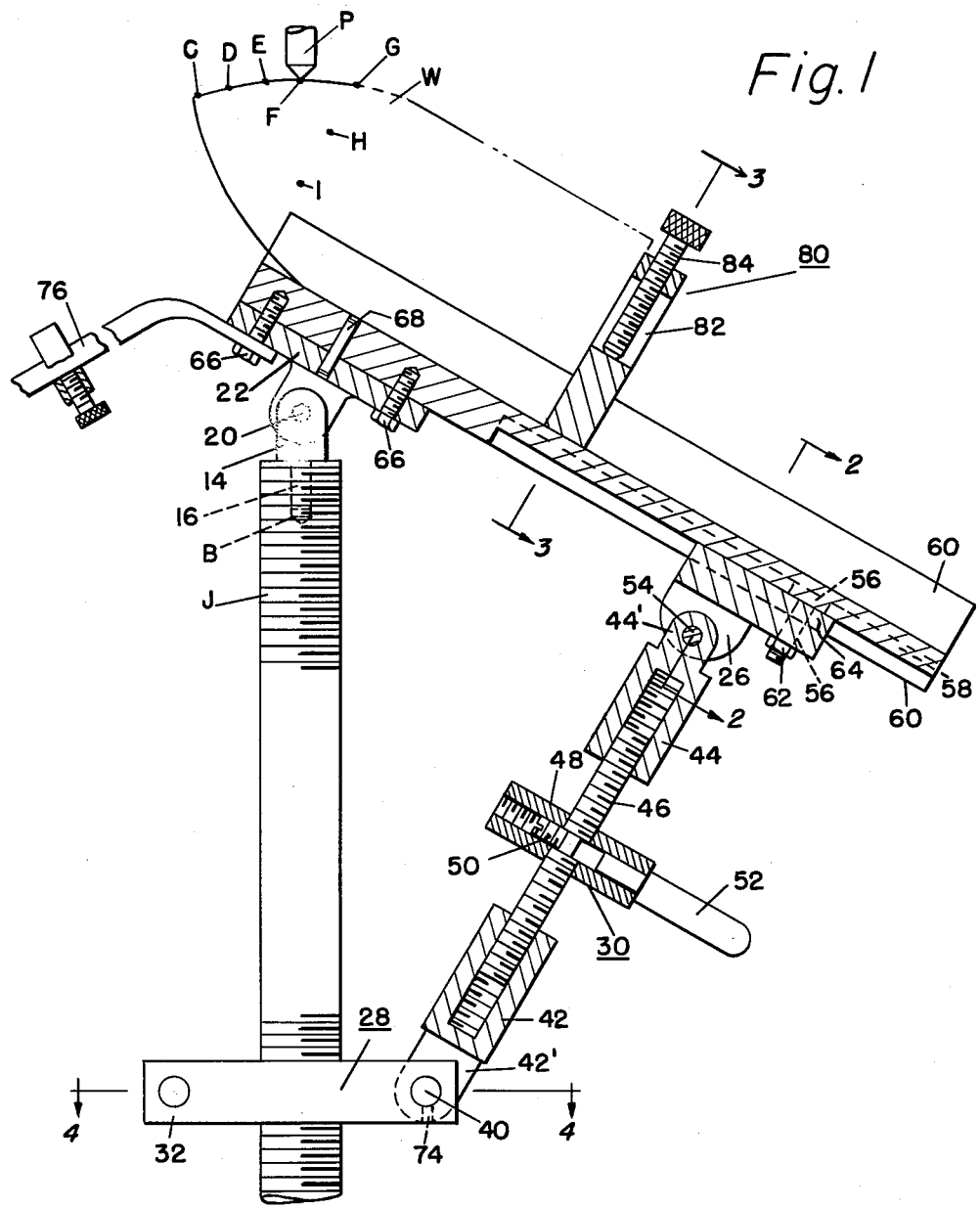
FIG. 1 is essentially a vertical section through a preferred embodiment of the invention.
Figure 3:
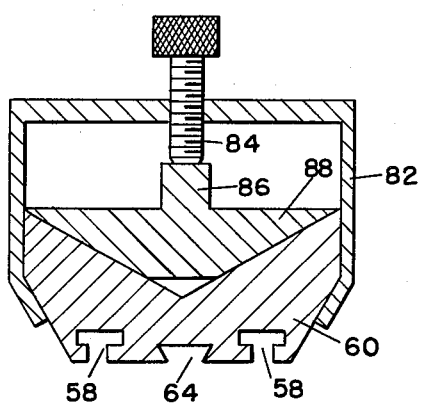
Figure 4:
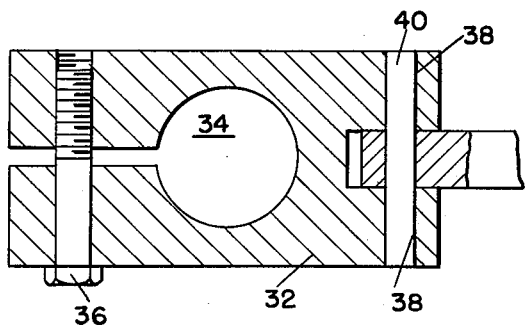
Figure 5:
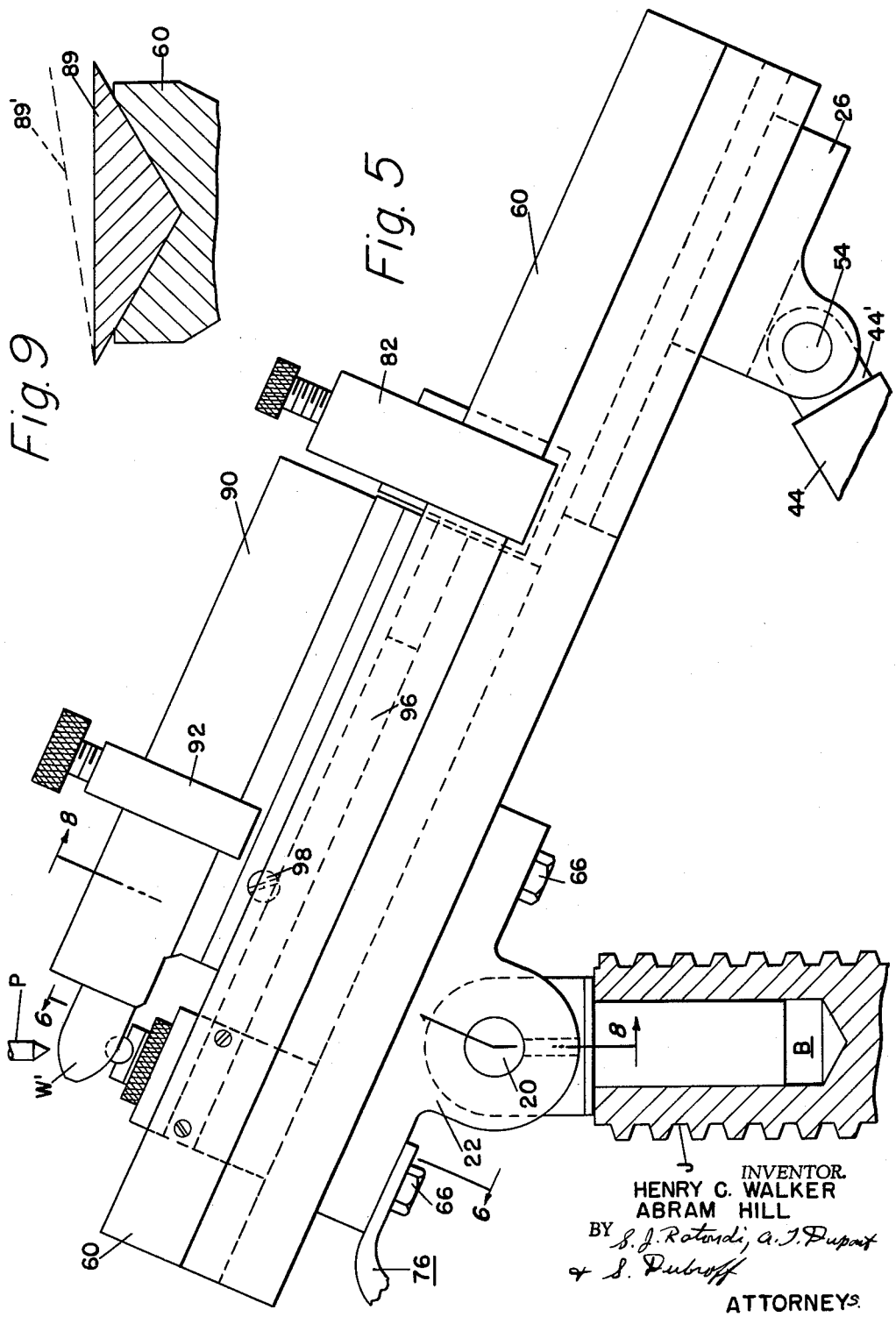
Figure 6:
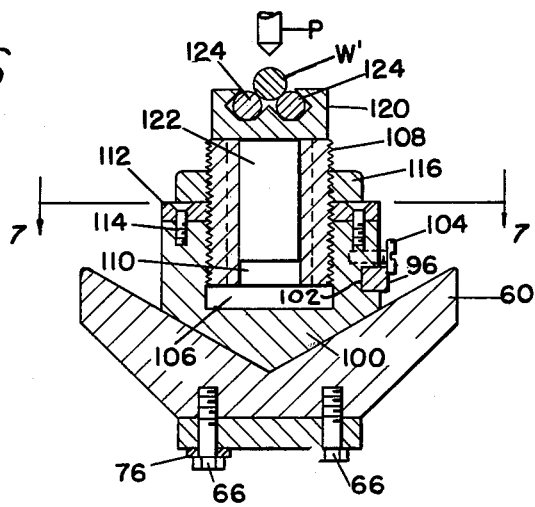
Figure 7:
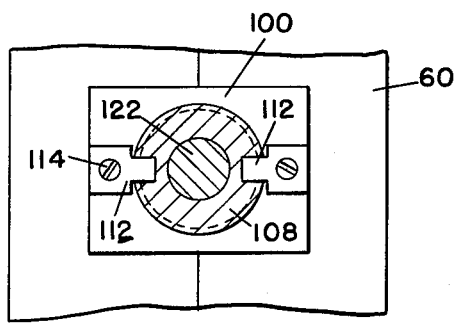
Figure 8:
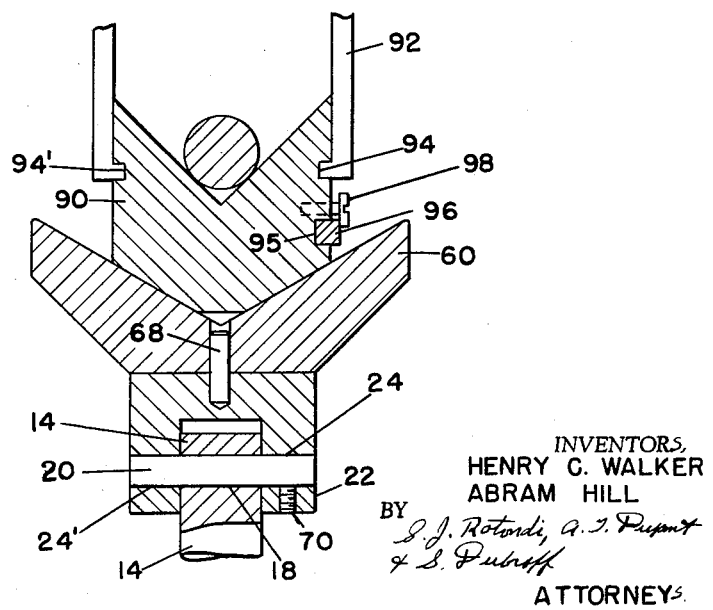

FIGS. 3 and 4 are fragmented sectional views taken along lines 3—3 and 4—4 respectively of FIG. 1;

FIG. 5 is an elevational view of the preferred embodiment of the invention and additionally showing cooperating auxiliary equipment for use on smaller components;

FIG. 6 is a sectional view taken on line 6—6 of FIG. 5 looking in the direction of the arrows;

FIG. 7 is a sectional view taken substantially along line 7—7 of FIG. 6;

FIG. 8 is a section taken along line 8—8 of FIG. 5; and

FIG. 9 is a sectional view of the preferred embodiment of the invention showing an attachment thereto for measuring hardnesses on flat tapered surfaces.

Referring to the drawings and more particularly to FIG. 1 thereof, the embodiment illustrated comprises a jack screw J of a hardness testing machine having a vertical bore B disposed therein. Supported on the screw J is an adapter 14 having a shaft 16 removably inserted within the bore. The adapter is provided with an aperture 18 (FIG. 8) for receiving a pin 20 which supports an upper or front swivel plate member 22 through mating ports or apertures 24 and 24' provided in the legs of the swivel plate.

A lower or rear swivel plate member 26, generally similar to the upper swivel plate with certain differences to be noted hereinafter, is adjustably secured to the jack screw by means of a clamp 28 (FIG. 4) and turnbuckle assembly 30. The clamp 28 may be of any suitable type and optionally may comprise a slotted body 32 having an unthreaded vertical bore 34 (FIG. 4) centrally disposed therethrough to permit the rapid setting-up of our inventive device.

The slotted portion of the clamp is provided with a locking bolt 36 for securing the clamp to the jack screw in any desired location while the other end of the clamp is apertured at 38 to receive a transverse pin 40 for pivotally supporting turnbuckle assembly 30. The turnbuckle assembly comprises a pair of oppositely threaded nut swivel cups 42 and 44, each having an apertured flange 42' and 44', respectively, extending therefrom, the cups being interconnected by a corresponding threaded adjusting screw 46 which is manually rotatable in either direction by means of a turnbuckle 48 centrally thereof and secured thereat by set screws 50, only one of which is illustrated. Pin handles 52 may optionally be employed with turnbuckle 48 for facilitating rotation thereof.

Nut swivel cup 44 is shown (FIG. 2) pinned to rear swivel plate 26 at 54, the latter carrying a pair of T-bolts 56, the heads of which slidably engage mating T-slots 58 provided in an anvil 60, the slots extending axially from the lower end of the anvil to approximately midway thereof.

The T-bolts are threaded only at their end portions such that tightening nuts 62 thereon will maintain the rear swivel plate 26 immovable in the anvil.

Figure 2:
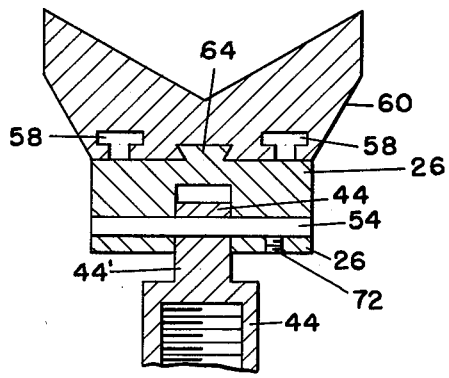
FIG. 2 is a sectional view taken substantially along line 2—2 of FIG. 1.

Anvil 60 is generally T-configurated in cross section and is axially grooved or dovetailed at its base for slidably receiving a corresponding projection 64 atop the rear swivel plate 26, the groove being coextensive with the T-slots and aligned therewith. At its upper end (FIG. 1), the anvil is rigidly fastened to the front swivel plate 22 by a plurality of screws 66 and including centering dowels 68, only one of which is shown. Pivot pins 20, 54, and 40, cooperate with centering screws 70, 72 and 74, as shown in FIGS. 8, 2 and 1 respectively, in aiding to align our entire inventive device and yet permitting generally unimpeded pivotal movement between the respective parts.

A counterweight assembly is shown at 76 and is conveniently held to upper swivel plate 22 by screw 66 and maintains the inventive device in balanced relation about the jack screw.

In the illustrative embodiment of FIG. 1, the workpiece W represents an armor piercing shot, for example, and rests within the V of anvil 60, the point F on the ogive of the shot being readied for hardness measurement. A back-up plate clamp assembly 80 prevents the shot from sliding rearwardly and comprises a clamp member 82 centrally threaded for receiving a screw 84 which bears on abutment 86 integral with a back-up plate 88 seated in the anvil V, all as depicted in FIG. 3.

In the operation of our inventive device, let us assume workpiece W to be a shot or shell wherein its ogive is arbitrarily marked with spaced points C, D, E, F, and G defining an arc of a circle having its center coinciding with pin 20, and along which hardness readings are desired to be taken. The device will be set-up generally in accordance with the drawing of FIG. 1, the T-bolts in the rear swivel plate made fast in the anvil T-slots and the jack clamp 28 and back-up plate clamp assembly 80 secured in operable position. The turnbuckle 48 need now only to be rotated so as to bring any of these points on the ogive directly under and perpendicular to penetrator P of the hardness testing machine. The jack screw J may be raised until the minimum load is applied to the surface to be tested, the dial gauge (not shown) of the hardness testing machine reset, and the major load applied, each of those steps being in accordance with standard operating procedures. It should be remembered that jack screw J does not rotate when being elevated or depressed and it is therefore apparent that the entire inventive assembly will be raised or lowered in response to vertical movement of the jack screw. Any subsequent hardness readings may rapidly and accurately be obtained by simple rotation of the turnbuckle.

If it is now desired that readings be obtained along spaced points on the circumference of the ogive, for example, at points F, H, and I, the shell itself may be manually rotated until the desired point is caused to become perpendicular to the penetrator. It is obvious, of course, that the workpiece need not necessarily be ogival if circumferential readings are desired to be obtained.

However, if the shell's nose does not define an arc of a circle as aforedescribed, our device is yet highly capable of obtaining rapid and accurate hardness readings on such surfaces. The surface of the workpiece desired to be tested is brought perpendicular to the penetrator by means of the turnbuckle, and the various standard loads then applied. On succeeding readings, it will now become necessary to move the workpiece along the V of the anvil as well as rotate the turnbuckle 48 in order to bring the surface of the piece directly under and perpendicular to the penetrator.

Referring now to FIG. 9 of the drawings, a modification of our invention is therein illustrated for rapidly permitting hardness readings to be taken on flat tapered surfaces, and comprises an elongate 3-sided plate member 89 which has its lower sides mating the anvil V, their opposed sides supporting the flat tapered workpiece. In the operation of this modification, the tapered workpiece is allowed to rest on plate 89 and the turnbuckle rotated until the plane of the surface to be tested is horizontal or perpendicular to the penetrator. Subsequent readings may be obtained by sliding the tapered workpiece axially of the anvil. It is apparent that the upper side of plate 89 may be inclined at various angles as indicated by the dotted lines 89' to accommodate correspondingly tapered workpieces. Any suitable type clamp may be used to fasten the workpiece to the plate, if necessary.

The modification or attachments shown in FIGS. 5, 6, 7 and 8 enable small arm components or workpieces to be readily tested with high precision. An auxiliary V-block 90, FIGS. 5 and 8, slidable along the anvil V, carries the small component W' along its V, which is disposed generally similarly to the anvil V. The component W' is supported rearwardly by any suitable type clamping means, such, for example, as at 92 (FIG. 8) which rides in a pair of opposed slots 94—94' of block 90. The block 90 is slotted at 95 to receive a lateral guide bar 96 which may be conveniently secured thereto by locking screw 98, the guide bar extending into block 90 from an elevating block 100. Elevating block 100 has a corresponding slot 102 for carrying the guide bar which is fixed thereto by screws 104. Elevating block 100 is similarly slidable along the anvil V and, in operative position, will be placed to the left of auxiliary block 90 as indicated in FIG. 1. As shown in FIG. 6, elevating block 100 is provided with an unthreaded vertical bore 106 extending a major portion of its length for receiving an exteriorly threaded elevating screw 108 having a central aperture 110 therethrough. The elevating screw 108 is further provided with a pair of axial keyways for receiving key members 112—112 fixed to the elevating block 100 by screws 114, and preventing elevating screw 108 from rotating upon turning of adjusting nut 116. The key members 112—112 are flush mounted with the top of elevating block 100 as shown in FIG. 6, but may optionally be slightly depressed therein so that adjusting nut 116 will be well supported on the elevating block. A rest 120 has a guide or shaft portion 122 within central aperture 110 of elevating screw 108 and comprises at its upper or head end a pair of rotatable bearings 124—124 for supporting the hard to measure surface to be tested. As illustrated in FIG. 6, rest 120 is peened over at its uppermost portion to prevent escape of bearings 124—124 and yet allowing the workpiece surface to center itself directly between the bearings and under and perpendicular to the penetrator.

In the operation of the aforedescribed attachment, auxiliary V-block 90 and the entire elevating block assembly are seated along the V of anvil 60, such that the rotatable bearings are directly under the penetrator as shown in FIG. 5. The small arm component or workpiece W', resting within the V of the auxiliary block 90, is prevented from sliding downwardly by means of clamp 92, and the auxiliary block 90 similarly secured in place by clamp 82. Guide bar 96 is caused to ride in slot 95 of auxiliary block 90 and secured thereat by screw 98. Elevating screw 108 may now be raised, if necessary, by rotating the adjusting nut 116. Since elevating screw 108 is not threaded to elevating block 100, and is prevented from rotating by means of the key members, rotation of nut 116 will produce a raising or lowering of screw 108 and hence, of rest 120. Rotation of turnbuckle 48 will now bring the surface of the workpiece W' to be tested normal to the penetrator and the jack screw raised as aforediscussed.

It is apparent from the foregoing disclosure that we have provided a novel device which is capable of ready attachment to many hardness testing machines, and, if necessary, by varying the diameter of the adapter shaft, its utility may be further extended to other hardness machines. The device described is capable of rapid, accurate and non-destructive hardness determinations and its flexibility almost unlimited by virtue of the adjustability provided by the axially movable jack clamp 28, the length of the adjusting screw 46 used and the multipositioning afforded the rear swivel plate 26 in the anvil T-slots. Further, in the practice of our invention, hardness readings may be obtained on large or small components having ogival, radial or flat tapered surfaces in a minimum of time and with good efficiency.

We claim:

1. In combination with a hardness testing machine including a penetrator and a jack screw having an axial upper bore, an adjustable attachment for use with said machine for determining the hardness of a component having a radial, ogival or tapered surface, said attachment comprising an adjusting clamp mounted to said screw below said bore, a shaft within said bore providing an adapter extension larger than said bore and resting on said screw, a front swivel plate, an adapter pin connecting said adapter extension and said front swivel plate for permitting pivotal movement of said plate, a rear swivel plate, a pair of spaced T-bolts adjustably mounted through said rear swivel plate, an anvil having a forward end affixed to said front swivel plate and a rear end articulating with said rear swivel plate, said anvil having a cross-section of V-configuration the vertices of which form a line extending from said forward end to said rear end and providing rearwardly a pair of symmetrical T-slots for slidably receiving said T-bolts, means for locking the T-bolts in said T-slots, a turnbuckle assembly having its upper end pivotally mounted to said rear swivel plate and its lower end pivotally mounted to said jack clamp, each of said pivotal mounts being so arranged that the anvil is caused to rotate around said adapter pin upon adjustment of the turnbuckle assembly when the rear swivel plate is locked to the anvil, and means for supporting said component under and normal to said penetrator.

2. A combination according to claim 1 further comprising an adjustable clamp member securable to said anvil for supporting said component and preventing rearward movement thereof.

3. A combination according to claim 1 further characterized by a counter-weight assembly depending from said front swivel plate.

4. Apparatus as described in claim 1 wherein said turnbuckle assembly comprises first and second threaded nut swivel cups the threads thereof being opposed to each other, each of said cups having an apertured flange, an adjusting screw interconnecting said cups and correspondingly threaded for coaction therewith, a turnbuckle fastened generally centrally of said adjusting screw, a first pivot pin within the apertured flange of said first threaded nut swivel cup and said jack clamp, a second pivot pin within the apertured flange of said second threaded nut swivel cup and said rear swivel plate, said turnbuckle assembly being pivotable about said first and second pivot pins when said turnbuckle is rotated to displace said anvil.

5. In combination with a hardness testing machine including a penetrator and a jack screw having an axial upper bore, an adjustable attachment for use with said machine for determining hardness of workpieces having flat tapered surfaces, said attachment comprising an adjusting clamp mounted to said screw below said bore, a shaft within said bore providing an adapter extension larger than said bore and resting on said screw, a front swivel plate, an adapter pin connecting said adapter extension and said front swivel plate for permitting pivotal movement of said plate, a rear swivel plate, a pair of spaced T-bolts adjustably mounted through said rear swivel plate, an anvil having a forward end affixed to said front swivel plate and a rear end articulating with said rear swivel plate, said anvil having a cross-section of V-configuration the vertices of which form a line extending from said forward end to said rear end and providing rearwardly a pair of symmetrical T-slots for slidably receiving said T-bolts, means for locking said T-bolts in said T-slots, a turnbuckle assembly having its upper end pivotally mounted to said rear swivel plate and its lower end pivotally mounted to said jack clamp, an elongate multi-sided plate having its two lower sides in mating relation to the V-configurated anvil and its uppermost side presenting a flat surface in accordance with the tapered workpiece such that rotation of the turnbuckle will cause the flat tapered surface to be tested to become perpendicular to the penetrator when the rear swivel plate is locked to said anvil.

6. In combination with a hardness testing machine including a penetrator and a jack screw having an axial upper bore, adjustable attachments for use with said machine for determining the hardness of small components having radial, ogival and tapered surfaces, said attachments comprising an adjusting clamp mounted to said screw below said bore, a shaft within said bore providing an adapter extension larger than said bore and resting on said screw, a front swivel plate, an adapter pin connecting said adapter extension and said front swivel plate for permitting pivotal movement of said plate, a rear swivel plate, a pair of spaced T-bolts adjustably mounted through said rear swivel plate, an anvil having a forward end affixed to said front swivel plate and a rear end articulating with said rear swivel plate, said anvil having a cross-section of V-configuration the vertices of which form a line extending from said forward end to said rear end and providing rearwardly a pair of symmetrical T-slots for slidably receiving said T-bolts, means for locking said T-bolts in said T-slots, a turnbuckle assembly comprising a threaded nut swivel cup and an oppositely threaded nut swivel cup, each of said cups having an apertured flange, an adjusting screw interconnecting said cups and correspondingly threaded for coaction therewith, a turnbuckle fastened generally centrally of said adjusting screw, a pivot pin within the apertured flange of said nut swivel cup and said jack clamp, another pivot pin within the apertured flange of said oppositely threaded nut swivel cup and said rear swivel plate, an auxiliary block and an elevating block having their lower sides adapted for slidable mating engagement with the anvil V, said auxiliary block being generally V-configurated in cross section, the elevating block having a vertical bore centrally disposed therein, an exteriorly threaded elevating screw member within said elevating block bore extending upwardly thereof and having an axial aperture therethrough, a pair of opposed exterior keyways extending the length of said elevating screw, a pair of keys affixed to said elevating block for coaction with said keyways, an adjusting nut screw-threadedly engaging the elevating screw, said nut resting on an upper surface of said elevating block, a rest movable in response to elevation or depression of said elevating screw when the adjusting nut is rotated, said rest comprising a guide within the elevating screw aperture and a head member carrying a pair of spaced exposed rotatable bearings, a guide bar extending between the auxiliary block and the elevating block and lockable therewith, said component resting along the V of said auxiliary block and said component surface to be tested centrally supported by said rotatable bearings, means clampable to the auxiliary block and to the anvil for preventing downward movement of the workpiece and auxiliary block respectively and counter-weight means for maintaining operational balance of the attachments about said machine.

References Cited in the file of this patent

UNITED STATES PATENTS 1,890,923  Wilson _____ Dec. 13, 1932

FOREIGN PATENTS 464,069  Great Britain _____ Apr. 12, 1937